US008816545B2

(12) United States Patent
Fukuoka et al.

(10) Patent No.: US 8,816,545 B2
(45) Date of Patent: Aug. 26, 2014

(54) ELECTRIC TOOLS

(75) Inventors: Toru Fukuoka, Anjo (JP); Kenichi Ota, Anjo (JP)

(73) Assignee: Makita Corporation, Anjo-shi (JP)

( * ) Notice: Subject to any disclaimer, the term of this patent is extended or adjusted under 35 U.S.C. 154(b) by 87 days.

(21) Appl. No.: 13/466,536

(22) Filed: May 8, 2012

(65) Prior Publication Data

US 2012/0313464 A1 Dec. 13, 2012

(30) Foreign Application Priority Data

Jun. 8, 2011 (JP) ................................. 2011-128041

(51) Int. Cl.
*H02K 7/14* (2006.01)
*H02K 21/22* (2006.01)
*B25F 5/00* (2006.01)
*H02K 7/116* (2006.01)

(52) U.S. Cl.
CPC ............... *H02K 7/145* (2013.01); *H02K 21/22* (2013.01); *H02K 7/116* (2013.01); *B25F 5/008* (2013.01)
USPC .............................. 310/50; 310/91; 310/68 R

(58) Field of Classification Search
CPC ............................... H02K 7/145; H01H 9/063
USPC ..................................... 310/91, 50
IPC ....................................... H02K 7/14
See application file for complete search history.

(56) References Cited

U.S. PATENT DOCUMENTS

| | | | | |
|---|---|---|---|---|
| 5,933,969 | A | * | 8/1999 | Houben et al. .................. 30/390 |
| 2002/0063494 | A1 | * | 5/2002 | Yoshikawa et al. ........... 310/261 |
| 2008/0146127 | A1 | * | 6/2008 | Gallagher et al. ............. 451/359 |
| 2009/0179507 | A1 | * | 7/2009 | Tanimoto ........................ 310/50 |
| 2011/0031825 | A1 | * | 2/2011 | Sengiku .......................... 310/50 |
| 2011/0204787 | A1 | * | 8/2011 | Schoen et al. .................. 315/76 |
| 2011/0241457 | A1 | | 10/2011 | Muller et al. |
| 2012/0066916 | A1 | | 3/2012 | Heinzelmann et al. |

FOREIGN PATENT DOCUMENTS

| | | |
|---|---|---|
| CN | 1356758 A | 7/2002 |
| CN | 101488681 A | 7/2009 |
| EP | 1 930 124 A1 | 6/2008 |
| EP | 2 371 202 A2 | 10/2011 |
| EP | 2 431 132 A2 | 3/2012 |
| JP | A-2007-98562 | 4/2007 |

OTHER PUBLICATIONS

Extended European Search Report issued in European Application No. 12167429.5 dated Oct. 1, 2012.
Office Action dated Jan. 15, 2014 issued in Chinese Patent Application No. 201210160499.3 (with English Translation).

* cited by examiner

*Primary Examiner* — Terrance Kenerly
(74) *Attorney, Agent, or Firm* — Oliff PLC

(57) ABSTRACT

Embodiments of the present invention may include an electric tool comprising an outer rotor type electric motor as a driving source and a stator supporting member made from metal. The motor preferably includes a stator and a rotator. The stator is preferably supported by the stator supporting member. The rotator is preferably located at an outer periphery of the stator.

10 Claims, 4 Drawing Sheets

FRONT ← → REAR

ELECTRIC TOOLS

This application claims priority to Japanese patent application serial number 2011-128041, the contents of which are incorporated herein by reference.

Embodiments of the present invention relate to an electric tool including an outer rotor type electric motor such as a portable circular saw.

An outer rotor type electric motor disclosed in Japanese Laid-Open Patent Publication 2007-98562 is a brushless motor having a rotor and a stator. The rotor includes a permanent magnet with a north pole and a south pole. The rotor is located outside of the motor. The stator includes a three-phase stator winding and is located inside the motor. The magnet of the outer rotor type electric motor has a larger surface area than that of an inner rotor type motor of the same size. For this reason, the outer rotor type electric motor can have a larger torque than that of the inner rotor type electric motor. Saying it another way, a smaller outer rotor type electric motor can output the same amount of torque as a larger inner rotor type electric motor.

The output from an electric tool has been increased through the lengthening of the motor in an axial direction. When the output is made higher, load current and heat generated from the electric motor increase. For this reason, the electric motor is cooled to prevent any decrease in the performance of the motor. A cutting tool typically has a higher load current than that in other electric tools such as an electric screwdriver.

Therefore, there is a need for electric tool capable of cooling an outer rotor type electric motor efficiently.

Certain embodiments of the present invention include an electric tool comprising an outer rotor type electric motor and a stator supporting member made from metal. The motor preferably includes a stator supported by the stator supporting member and a rotator located at an outer periphery of the stator.

The stator supporting member may have a high thermal conductivity because the stator supporting member is preferably made from metal. Thus, the stator supporting member allows the heat generated in the stator to be efficiently released to the stator supporting member. As a result, the motor can be efficiently cooled.

Additional objects, features, and advantages, of the present invention will be readily understood after reading the following detailed description together with the claims and the accompanying drawings, in which:

Each of the additional features and teachings disclosed above and below may be utilized separately or in conjunction with other features and teachings to provide improved electric tools. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
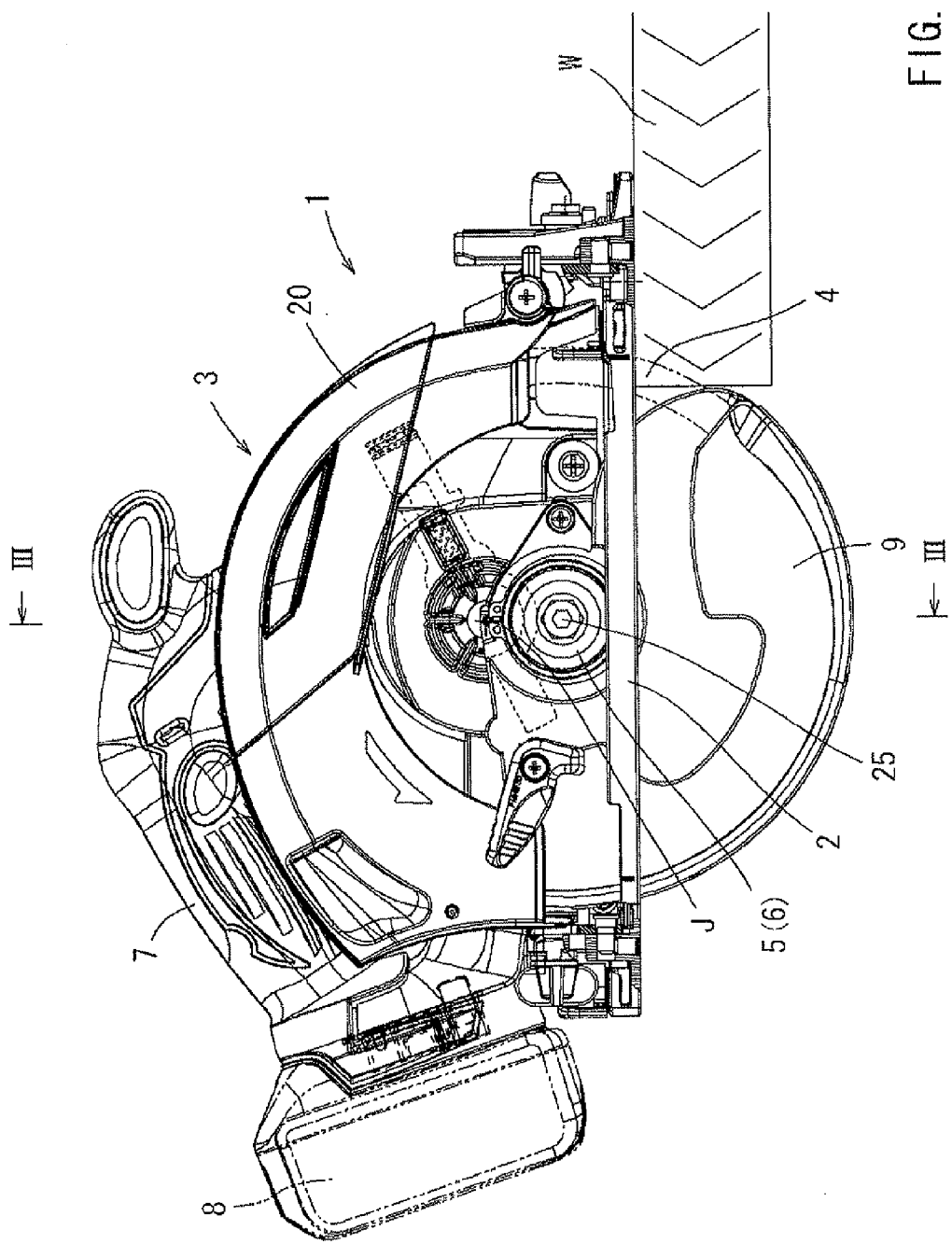
FIG. 1 is a front view of an electric tool of a present invention.
Figure 2:
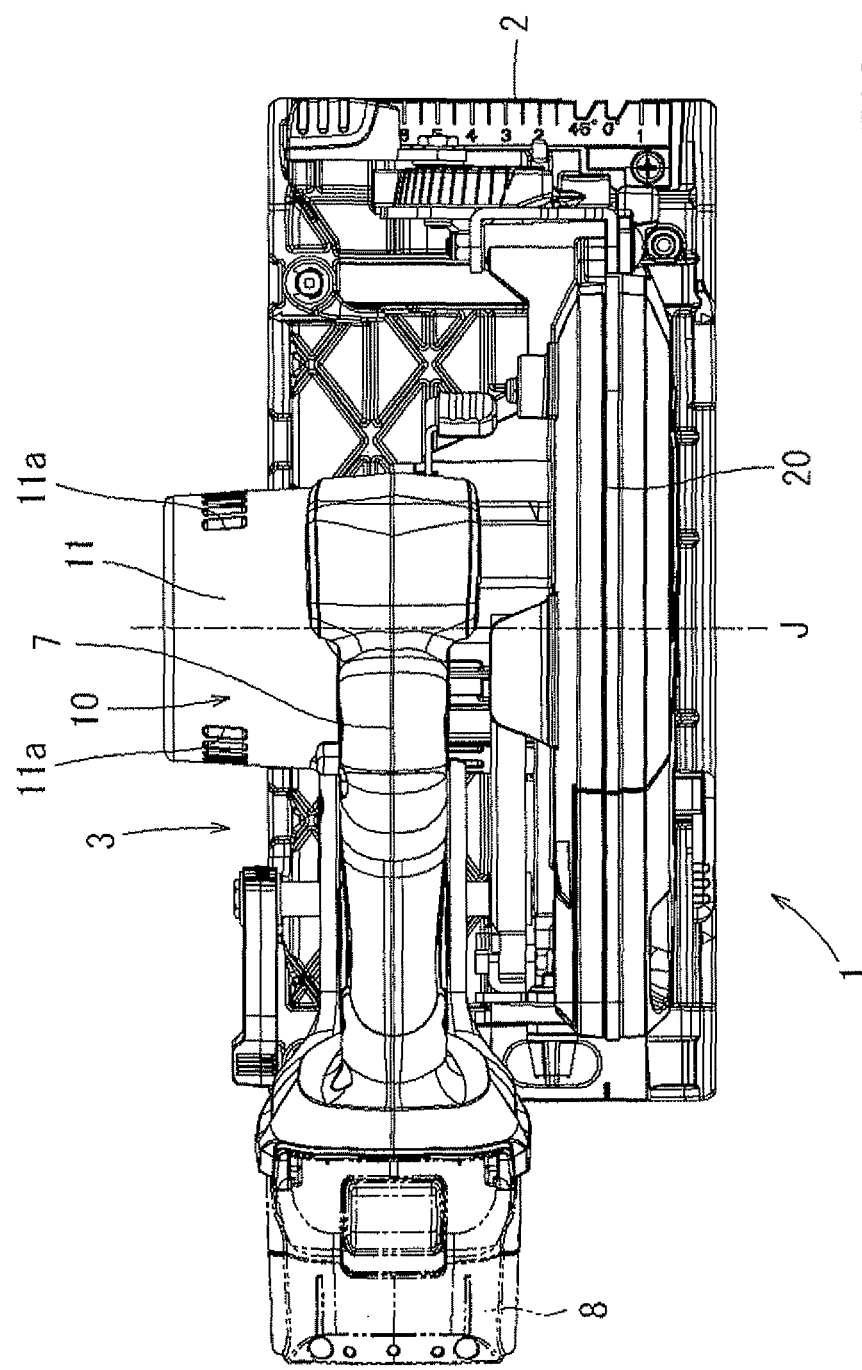
FIG. 2 is a plan view of the electric tool.

Certain embodiments of the invention will be described in reference to FIGS. 1 to 3. An electric tool 1 shown in FIGS. 1 and 2 is a portable circular saw as one of cutting tools. The electric tool 1 includes a plane-shaped base 2 in contact with an upper surface of a member W to be cut and a tool main body 3 supported by the base 2. A loop handle 7 gripped by a user is provided on the tool main body 3. A battery pack 8 is attached as a power source on the rear side of the handle 7 (left side of FIGS. 1 and 2).

The tool main body 3 may include an electric motor 10 and a circular rotary cutting tool 4 rotated by the electric motor 10. The lower part of the rotary cutting tool 4 may protrude from the lower side of the base 2 and cut the member W to be cut. The lower part of the rotary cutting tool 4 may be covered with a movable cover 9 which can be opened and closed.

Figure 3:
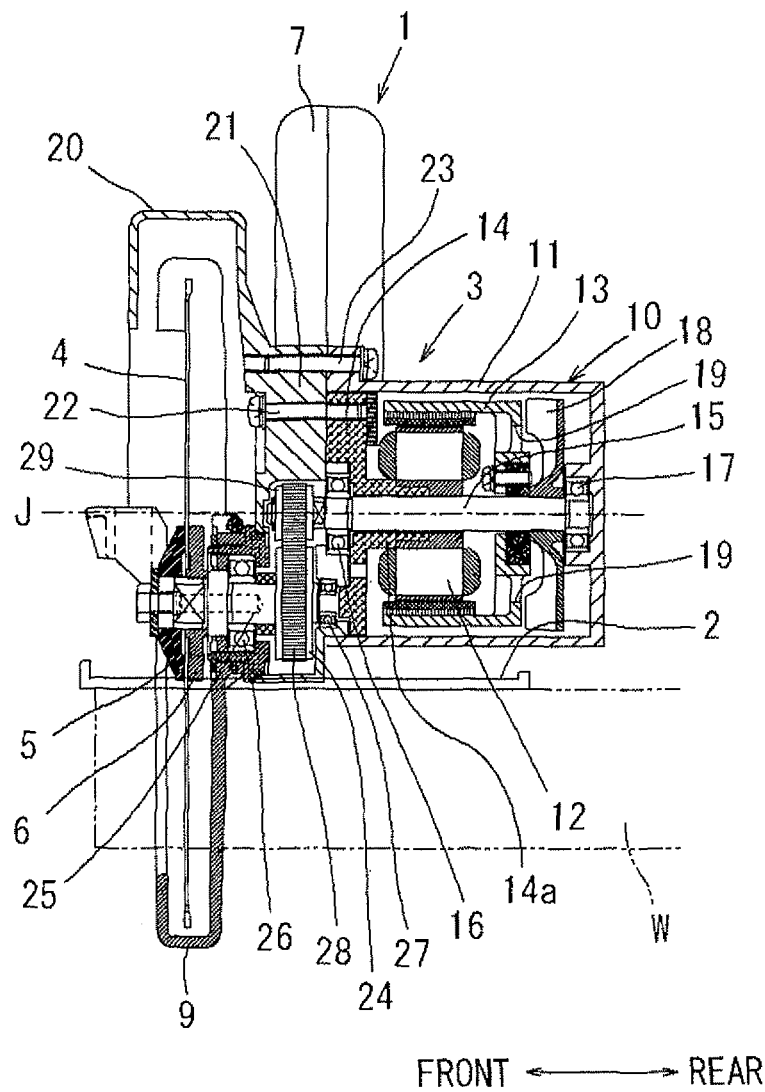
FIG. 3 is a vertical cross-sectional view of the electric tool taken along line III-III in FIG. 1.

The electric motor 10 may be an outer rotor type brushless motor as shown in FIGS. 2 and 3. The electric motor 10 preferably includes a stator 12 fixed inside a motor housing 11 and a rotor 13 rotatably supported on the outer periphery of the stator 12. The stator 12 is preferably supported by a boss portion 14a of a stator supporting member 14. The stator 12 is preferably fixed inside the motor housing 11 around a motor shaft line J. The stator supporting member 14 is preferably made from metal with a high thermal conductivity. The boss portion 14a in the stator supporting member 14 is preferably in direct contact with a core (laminated steel plate) of the stator 12, which allows the heat generated in the stator 12 to be efficiently released to the stator supporting member 14.

As shown in FIG. 3, an output shaft 15 is preferably attached to the rotator 13. The output shaft 15 may be rotatably supported by bearings 16 and 17. The rear side bearing 17 is preferably attached to the rear part of the motor housing 11 and the front side bearing 16 is preferably attached to the stator supporting member 14. A cooling fan 18 for cooling a motor is preferably provided at the rear of the output shaft 15.

As shown in FIGS. 2 and 3, an exhaust hole 11a may be provided at the rear side of the motor housing 11 located at the periphery of the cooling fan 18. An air intake hole is preferably provided at the front side of the motor housing 11. The cooling fan 18 may be rotated by the electric motor 10 to introduce the outside air from the air intake hole. The outside air (cooling wind) flows toward the rear part of the motor to cool the stator 12 and the rotator 13. The cooling wind flows inside the rotator 13 and is preferably expelled through a ventilation hole 19 provided at the rear (bottom) side of the rotator 13 and the exhaust hole 11a. The rotator 13 and exhaust hole 11a are preferably located at the rear side of the housing.

As shown in FIG. 3, the stator supporting member 14 is preferably attached by a fixation screw 22 to the rear side of a blade case 20. The blade case 20 may have a speed reduction case portion 21 at the rear side thereof. The stator supporting member 14 preferably overlaps and is attached to a rear side of the speed reduction case portion 21. The motor housing 11 may be combined with the rear side of the speed reduction case portion 21 by a fixation screw 23. The blade case 20 and the motor housing 11 are preferably made from metal with a high thermal conductivity, as this allows the heat generated in the stator 12 to be released first the stator supporting member 14 and then to the speed reduction case portion 21 of the blade case 20.

As shown in FIG. 3, the tip of the output shaft 15 of the electric motor 10 may protrude from the motor housing 11 and enter the speed reduction case portion 21. A drive pulley 29 is preferably attached to the tip of the output shaft 15. A spindle 25 may be rotatably supported by bearings 26 and 27 in the speed reduction case portion 21. The spindle 25 may be supported in parallel with a motor shaft line J of the output shaft 15. A driven pulley 24 having a larger diameter than that of the drive pulley 29 may be mounted to the rear part of the spindle 25. A drive belt 28 may be rolled around the driven pulley 24 and the drive pulley 29. The drive pulley 29, the driven pulley 24 and the drive belt 28 serve to adjust the speed of rotation output of the output shaft 15. Typically, they serve to output the rotation output at a reduced speed to the spindle 25. This reduced speed is determined by a certain speed reduction ratio.

The front of the spindle 25 typically protrudes toward the inside of the blade case 20. The rotary cutting tool 4 is preferably sandwiched between and firmly attached to a fixing flange 5 and a receiving flange 6.

As described above and shown in FIG. 3, the electric tool 1 preferably includes an outer rotor type electric motor 10 and a stator supporting member 14 made from metal. The motor 10 preferably includes the stator 12 supported by the stator supporting member 14 and the rotator 13 located at the outer periphery of the stator 12.

The stator supporting member 14 typically has a high thermal conductivity because the stator supporting member 14 is preferably made from metal. The stator supporting member 14 allows heat generated in the stator 12 to be efficiently released to the stator supporting member 14. As a result, the motor 10 can be efficiently cooled.

The electric tool 1 preferably includes an attachment base (motor housing 11 and blade case 20). As shown in FIG. 3, the attachment base preferably has a metal stator supporting member 14 attached thereto. This structure allows heat generated in the stator 12 to be efficiently released to the stator supporting member 14. The heat may also be released to the attachment base which may be made from a metal with high thermal conductivity.

As shown in FIG. 3, the electric tool 1 may include the circular rotary cutting tool 4 rotated by the motor 10 and the blade case 20 covering the rotary cutting tool 4. The blade case 20 may be configured to function as the attachment base. The electric tool 1 may be a cutting tool, which typically has a higher load current than other electric tools such as the electric screwdriver. In a similar fashion, the heat generated in the stator 12 may be higher than that found in other electric tools. Even if the electric tool 1 is a cutting tool, the blade case 20 may efficiently release the heat generated in the stator 12.

As shown in FIG. 3, the electric tool 1 preferably includes a motor housing 11. The motor housing 11 is configured to function as the attachment base. The motor housing 11 may efficiently release the heat generated in the stator 12.

The electric tool 1 preferably includes a bearing 16 held by the stator supporting member 14 and the output shaft 15 supported by the bearing 16. Thus, the heat generated in the stator 12 may be efficiently released to the output shaft 15 through the stator supporting member 14 and the bearing 16.

As shown in FIG. 3, the electric tool 1 preferably includes the cooling fan 18. The cooling fan 18 can generate a cooling wind. The cooling wind can be used for cooling the stator supporting member 14. Thus, the heat generated in the stator 12 can be released to the stator supporting member 14 and cooled by the cooling wind from the cooling fan 18.

Figure 4:
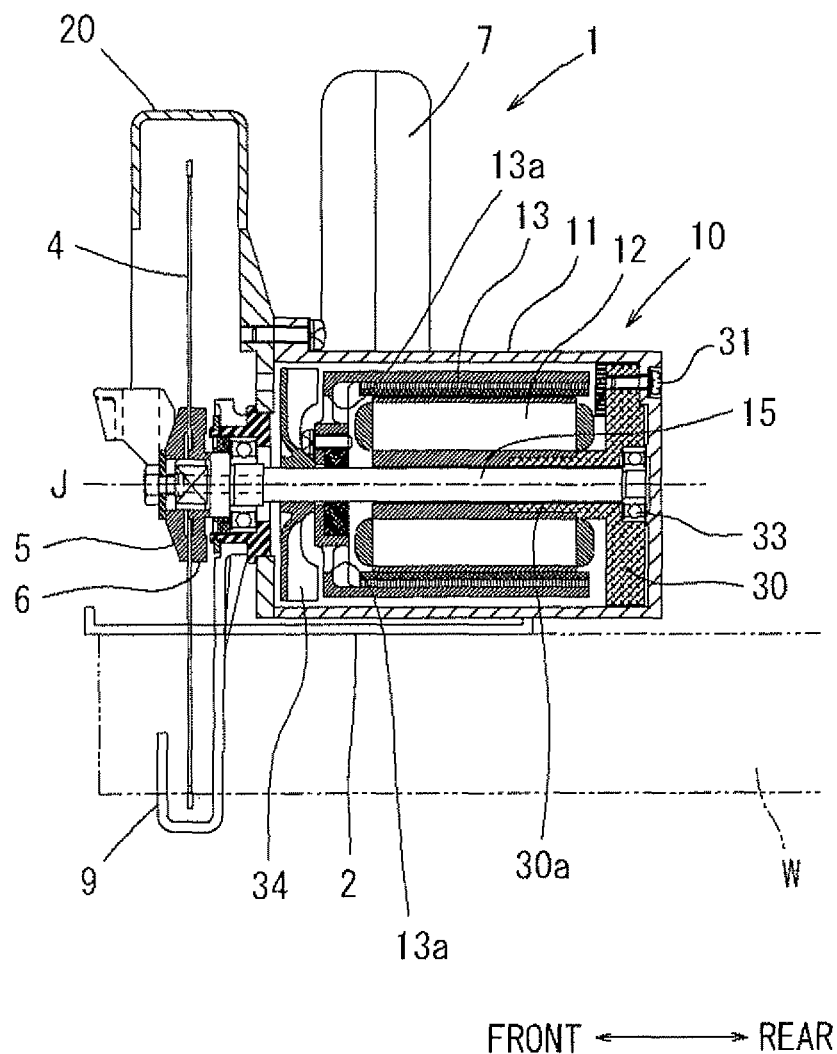
FIG. 4 is a vertical cross-sectional view of an electric tool with another configuration.

The electric tool 1 may have the structure shown in FIG. 4 instead of the structure shown in FIG. 3. The stator 12 shown in FIG. 4 may be supported by a stator supporting member 30 functioning as the attachment base. The stator supporting member 30 is preferably attached to the motor housing 11 by a fixation screw 31 and contacts a rear part of the motor housing 11. The stator supporting member 30 preferably includes a boss portion 30a which is in contact with a core (laminated steel plate) of the stator 12 and which supports the core. The stator supporting member 30 and the motor housing 11 are preferably made from metal with a high thermal conductivity. The heat generated in the stator 12 may be transferred to the motor housing 11 through the stator supporting member 30. In this way, the stator 12 can be efficiently cooled.

As shown in FIG. 4, a bearing 33 for supporting the rear side of the output shaft 15 may be attached to the stator supporting member 30. The heat generated in the stator 12 may be transferred to the output shaft 15 through the stator supporting member 30 and the bearing 33. In this way, the stator 12 can be efficiently cooled.

As shown in FIG. 4, a cooling fan 34 may be provided at the front of the output shaft 15. The wind for cooling generated by the cooling fan 34 may come in contact with the stator 12 through an air hole 13a provided at the front of the rotator 13.

The electric tool 1 shown in FIG. 4 is the direct-drive type electric tool, in which the tip of the output shaft 15 preferably protrudes directly toward the inside of the blade case 20. The tip of the output shaft 15 may be sandwiched between the fixing flange 5 and the receiving flange 6. It may also be attached to the circular rotary cutting tool 4.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The electric tool 1 shown in FIGS. 1 to 3 may include a speed reduction mechanism for reducing the speed of rotation output of the electric motor 10 to output the rotation output with the reduced speed to the spindle 25. As shown in FIG. 3, the speed reduction mechanism may be a belt transmission type speed reduction mechanism having a drive pulley 29, a driven pulley 24 and a drive belt 28. Alternatively, it may be a gear engaging type speed reduction mechanism having a drive side gear and a driven side gear.

The electric tool 1 may include the speed reduction mechanism as shown in FIG. 3. It also may be a direct-drive type electric tool without the speed reduction mechanism.

The electric tool may be a portable circular saw, or other electric tools such as an electric drill for making a hole, an electric screwdriver or an electric thread fastening machine for tightening screws.

This invention claims:

1. An electric tool comprising:
a main body; and
a handle protruding from the main body;
the main body including:
  a motor housing,
  a blade case attached to the motor housing, and the blade case configured to cover a circular rotary cutting tool,
  an outer rotor type electric motor provided in the motor housing as a driving source, and
  a stator supporting member made from metal, wherein the motor comprises a stator and a rotor wherein the stator is supported by the stator supporting member and the rotor is located at an outer periphery of the stator, wherein the stator supporting member is formed by one member and includes a support portion configured to support the stator and an attaching portion configured to be attached to the blade case or the motor housing;

the main body further including:
 an output shaft that is coupled to the rotor; and
 a cooling fan coupled to the output shaft;
 wherein the rotor includes air holes opposing the cooling fan through which cooling air passes to cool the stator.

2. An electric tool of claim 1, further comprising an attachment base made from metal, wherein the stator supporting member is attached to the attachment base.

3. An electric tool of claim 2, further comprising the circular rotary cutting tool rotated by the motor, wherein the blade case is configured to function as the attachment base.

4. An electric tool of claim 2, wherein the motor housing is configured to function as the attachment base.

5. An electric tool of claim 1, further comprising a bearing held by the stator supporting member, and wherein the output shaft is supported by the bearing.

6. An electric tool of claim 1, wherein the cooling fan generates a motor cooling wind for cooling the stator supporting member.

7. An electric tool of claim 1, wherein the attaching portion of the stator supporting member is attached to the blade case, and wherein the blade case is made from metal.

8. An electric tool of claim 1, wherein the attaching portion of the stator supporting member is attached to the motor housing, and wherein the motor housing is made from metal.

9. An electric tool of claim 1, wherein the cooling fan and the stator have substantially the same diameter, and wherein the motor housing includes a first portion configured to accommodate the cooling fan and a second portion configured to accommodate the stator, and the first and second portions have substantially the same diameter.

10. An electric tool of claim 1, wherein the rotor is between the fan and the stator, and the output shaft turns the cooling fan and draws air through the air holes to cool the stator.

* * * * *